United States Patent
Glass et al.

(10) Patent No.: US 9,980,307 B2
(45) Date of Patent: May 22, 2018

(54) METHOD AND APPARATUS FOR ORIENTATION-BASED PAIRING OF DEVICES

(71) Applicant: MOTOROLA SOLUTIONS, INC, Schaumburg, IL (US)

(72) Inventors: Stephen C. Glass, Plantation, FL (US); David J. Ley, Plantation, FL (US); Blake C. Moselle, Plantation, FL (US); Ellis A. Pinder, Davie, FL (US); Lee M. Proctor, Cary, IL (US); Darrell J. Stogner, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 157 days.

(21) Appl. No.: 15/075,349

(22) Filed: Mar. 21, 2016

(65) Prior Publication Data
US 2017/0273127 A1 Sep. 21, 2017

(51) Int. Cl.
*H04W 76/02* (2009.01)
*H04W 4/02* (2018.01)
*H04W 12/00* (2009.01)

(52) U.S. Cl.
CPC ......... *H04W 76/023* (2013.01); *H04W 4/026* (2013.01); *H04W 12/00* (2013.01)

(58) Field of Classification Search
CPC .................................................. H04W 4/026
See application file for complete search history.

(56) References Cited

U.S. PATENT DOCUMENTS

| | | | |
|---|---|---|---|
| 7,796,945 B2 | 9/2010 | Abbate et al. | |
| 7,796,954 B2 | 9/2010 | Whitaker Filho | |
| 7,907,901 B1 | 3/2011 | Kahn et al. | |
| 8,023,978 B2 | 9/2011 | Abbate | |
| 8,725,118 B2 | 5/2014 | Keller et al. | |
| 8,843,649 B2 | 9/2014 | Bailey | |
| 9,071,330 B2 | 6/2015 | Frantz | |
| 2014/0101056 A1 | 1/2014 | Chuang et al. | |
| 2014/0206288 A1* | 7/2014 | Liu | H04W 12/04 455/41.2 |
| 2015/0035762 A1* | 2/2015 | Lu | G06F 3/041 345/173 |
| 2015/0126118 A1* | 5/2015 | Lin | H04W 76/023 455/41.2 |
| 2015/0181634 A1* | 6/2015 | Cheng | H04W 4/008 455/426.1 |

(Continued)

FOREIGN PATENT DOCUMENTS

EP 2738706 A1 6/2014

OTHER PUBLICATIONS

The International Search Report and the Written Opinion, corresponding Serial No. PCT/US2017/022038, filed Mar. 13, 2017, all pages.

*Primary Examiner* — Kashif Siddiqui

(57) ABSTRACT

A method and apparatus for pairing devices is provided herein. During operation, an initial orientation of the two devices is determined. If the initial orientation of the two devices match a predetermined orientation offset from each other, then after a period of time, the orientation of the devices is again determined. If a final orientation of the two devices match a second predetermined orientation offset (e.g., devices are aligned), and both devices have rotated, then the two devices are paired.

11 Claims, 5 Drawing Sheets

(56) References Cited

U.S. PATENT DOCUMENTS

2015/0215770 A1* 7/2015 Chan .................... H04W 12/04
                                                        455/456.1
2017/0244811 A1* 8/2017 McKenzie ............. H04L 67/18

* cited by examiner

METHOD AND APPARATUS FOR ORIENTATION-BASED PAIRING OF DEVICES

FIELD OF THE INVENTION

The present invention generally relates to pairing devices, and more particularly to a method and apparatus for orientation-based pairing of devices.

BACKGROUND OF THE INVENTION

Many technologies pair devices. For example, Bluetooth uses a method called bonding for recognizing specific devices and thus enabling control over which devices are allowed to connect to each other. Devices then can establish a connection without user intervention. A bond is created through a process called "pairing". The pairing process is typically triggered by a specific request to create a bond from a user via a user interface.

Pairing typically involves some level of user interaction. This user interaction is the basis for confirming the identity of devices. Once pairing successfully completes, a bond will have been formed between the two devices, enabling those two devices to connect to each other in the future without again requiring the pairing process. When desired, the bonding relationship can later be removed by the user.

Many techniques exits that attempt to minimize user interaction when pairing, and "choose" what device to connect to. For example, in US Patent Publication No. 2013/0157573 entitled "Mobile Bluetooth Device", it is suggested to determine a spatial relationship between mobile Bluetooth devices to allow for an automatic reconnection of the mobile Bluetooth device to one of the number of Bluetooth terminals (e.g., automatically connect to the closest Bluetooth device). This allows reconnection without manual interaction by the user. Similarly, European Patent Application No. EP 2 672 762, entitled "Connecting the Highest Priority Bluetooth Device to a Device" automatically drops and connects Bluetooth devices based on a priority level.

A problem exists in the above techniques in that when you minimize user interaction during pairing, you increase the possibility that unwanted devices will be paired to each other. It would be desirable to have a technique to pair devices that requires minimal user input, yet reduces the possibility of unwanted pairings.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the abovementioned need, a method and apparatus for pairing devices is provided herein. During operation, an initial orientation of the two devices is determined. If the initial orientation of the two devices match a predetermined orientation offset from each other, then after a period of time, the orientation of the devices is again determined. If a final orientation of the two devices match a second predetermined orientation offset (e.g., devices are aligned), and both devices have rotated, then the two devices are paired.

As is evident, the initial orientation, the final orientation, and the fact that a rotation of both devices occurred is utilized to initiate and complete a collaborative association (pairing). Providing an example of the above, assume a master device and a slave device are to be paired. The user powers up the slave device and the master device. The user holds the devices close together with an offset orientation ("unlocked" orientation). A green LED on the master may flash to indicate that they are within close proximity and have the required offset orientation with respect to each other. At that point the user rotates both the master and slave device into a similar orientation (an *intuitive* locking motion to the "locked" orientation, for example, an aligned orientation). The devices automatically pair and both show, for example, solid green LEDs to indicate they are now paired.

It should be noted that the following description describes pairing in a Bluetooth environment (e.g., devices utilizing a Bluetooth communication system protocol), however one or ordinary skill in the art will recognize that pairing may take place as described, with devices using any communication system protocol. For example, pairing may take place as described herein utilizing a near-field communication system protocol as described in ISO/IEC 18092/ECMA-340—Near Field Communication Interface and Protocol-1 (NFCIP-1) or ISO/IEC 21481/ECMA-352—Near Field Communication Interface and Protocol-2 (NFCIP-2) protocols.

Figure 1:
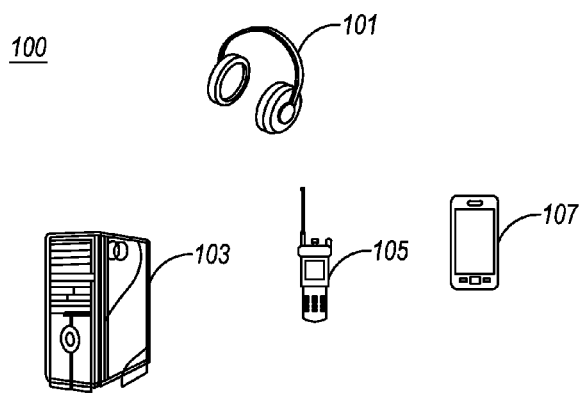
FIG. 1 shows a general environment using a short-range communication-system protocol.

FIG. 1 illustrates an environment where multiple devices exist that may be paired to each other. As shown, multiple devices 101-107 are within a same environment 100. Environment 100 may comprise, for example, any environment within a transmission range of a Bluetooth device (e.g., any area within, say, 100 feet). Devices 101-107 are considered Bluetooth devices in that they operate using Bluetooth, a short range wireless communications technology at the 2.4 GHz band, commercially available from the "Bluetooth SIG, Inc.". However, as described above, the present invention is not limited to devices using the Bluetooth protocol. Devices 101-107 may comprise devices such as a laptop computer, a personal computer, a public-safety radio, a smart phone, a headset, a pedometer, or any device capable of using Bluetooth communications.

Bluetooth identifies one master device and one or more slave devices. The number of slave devices is limited by the capability of the master device. The slave devices are synchronized to the timing and frequencies specified by the master device. In the present invention, pairing data can be shared among the master device and slave devices so that pairing can take place. Once devices are paired, the exchange of other types of data can take place. More specifically, Bluetooth Smart (Bluetooth LE introduced in the 4.0 standard) establishes a near proximity, out-of-band communication for the exchange of pairing information. Once a challenge has been completed, Bluetooth 2.1 BR/EDR identifies the fundamental communication transport between the paired devices.

As discussed above, a problem exists in that when you minimize user interaction during pairing, you increase the possibility that unwanted devices will be paired to each other. In order to address this issue, a master device will determine a nearby device that has a first orientation. This step may take place upon device power up, or may be initiated at any time by the user of the master device. The two devices having a correct initial orientation will be notified of a pairing attempt, for example, by vibrating, or having an LED light flash, . . . , etc. After the pairing notification has been sent, the users will rotate the devices into a final orientation and both devices will be paired only if they have been rotated, and their final orientation matches a predetermined final orientation.

Expanding on the above, during power up, or upon user initiation, unassociated devices will generate Bluetooth LE advertisement messages at certain intervals. The advertisement messages will include the orientation of the device. Upon power up or user initiation, a master device will both advertise and listen for advertisement messages from devices that are in close proximity (say a short distance such as several centimeters or less, as determined by a signal strength). In a similar manner, a slave device will also advertise and listen for advertisements. If the master or slave detects a candidate device that is within a near proximity, it will compare the orientation of the master and slave. If both devices have the proper offset orientation, the devices will provide some sort of intuitive feedback to the user (e.g. a flashing green LED) that indicates pairing will take place.

At that point, if the user rotates both devices to a similar orientation with respect to each other (e.g., both devices point up), the master and slave would detect the rotation to the similar orientation and trigger pairing. Orientation of each device is exchanged via Bluetooth advertisement messages. In addition a secure key may be derived from the shared orientation information. For additional security, the power level of Bluetooth LE could be reduced during the orientation/setup stage.

Once the pairing information is exchanged, Bluetooth Standard or Bluetooth Out-Of-Band pairing would be utilized to pair the devices. The master and slave could provide an indication to the user that they are now paired (e.g. a solid green LED).

Figure 2:
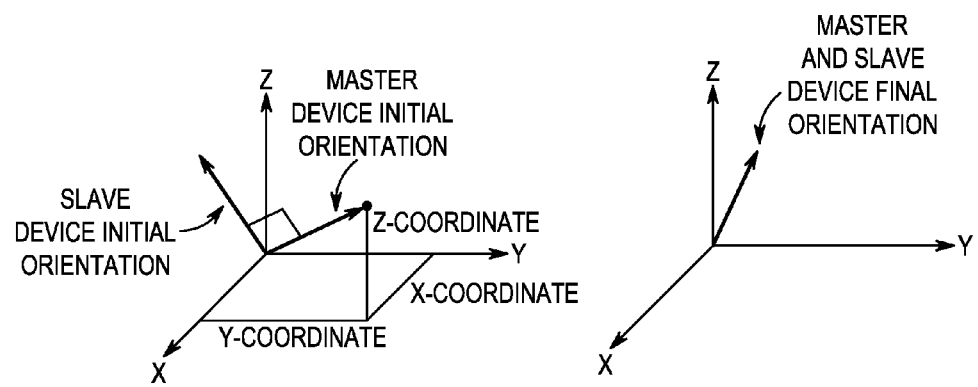
FIG. 2 illustrates device orientation during pairing.

FIG. 2 illustrates pairing devices as described above. During pairing, both the master and slave device share their orientations with each other. The master and slave devices attempt to pair with devices that are aligned and having a substantially 90 degree offset from each other. In other words, the master and slave devices search for all other devices within a predetermined range, having a 90 degree offset from each other. As shown in FIG. 2, the initial orientations of the master device and the slave device fulfill this requirement. Once the user(s) of the devices have been notified that a pairing is being attempted, the user(s) of the devices will rotate each device so that they substantially align in orientation. This is illustrated in FIG. 2 with the final orientation of both the master and slave devices substantially aligned. It should be noted, that simply having the master and the slave device aligned is not enough to complete the pairings. In order to complete the pairings both devices need to be rotated into alignment. This is again illustrated in FIG. 3 and FIG. 4.

Figure 3:
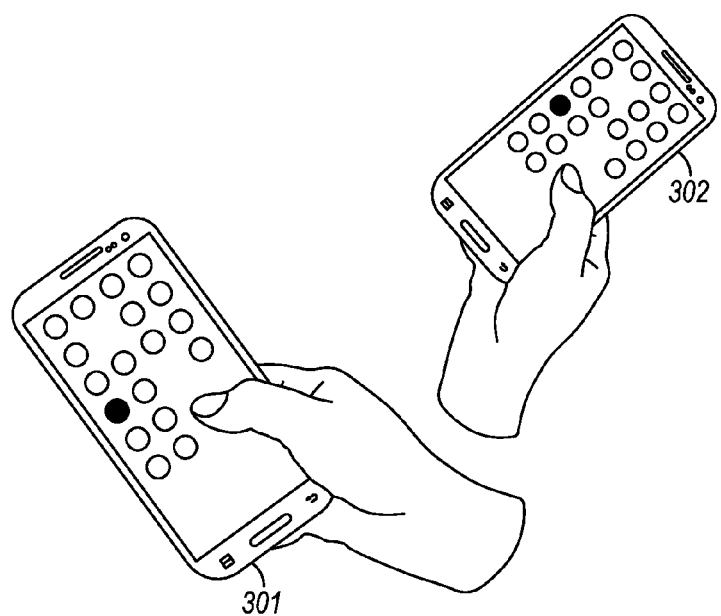
FIG. 3 illustrates pairing devices by rotating the devices.
Figure 4:
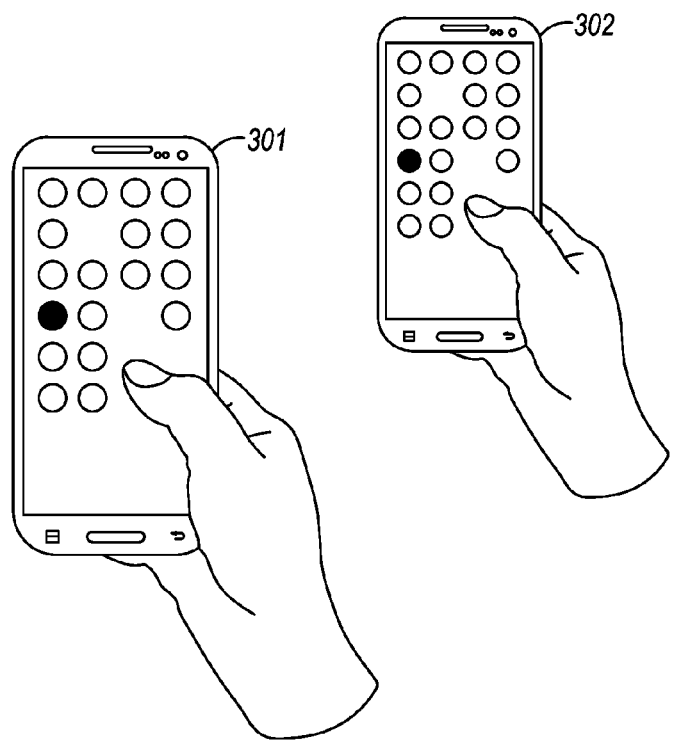
FIG. 4 illustrates pairing devices by rotating the devices.

As shown in FIG. 3, two devices 301 and 302 are substantially 90 degrees rotated from each other. When both devices detect this orientation, they will indicate to the user that pairing may take place. Once the user of the devices has been notified that pairing may take place, the devices can be rotated so that they are substantially aligned in orientation. This is illustrated in FIG. 4, where devices 301 and 302 have both been rotated into alignment. Pairing will then take place. It should be noted that the alignment of each device to initiate pairing, and the alignment of each device to complete pairing are relative to each other. In other words, absolute alignment with respect to some fixed point is not taken into consideration. The relative alignment with respect to each other is what triggers both the initiation and completion of pairing.

Figure 5:
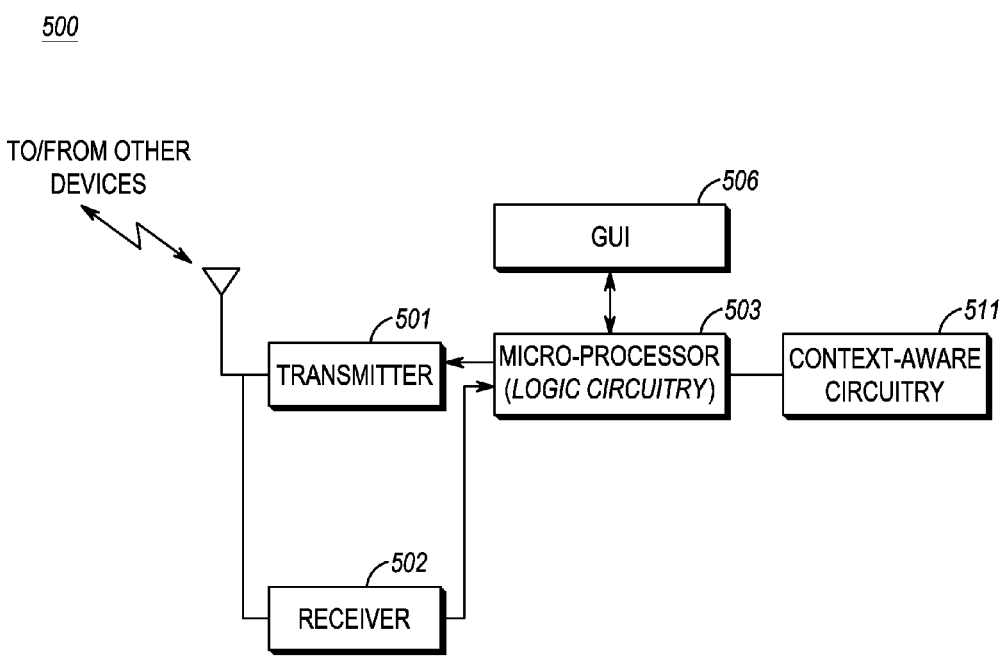
FIG. 5 is a block diagram showing a device configured to pair with other devices based on orientation.

FIG. 5 shows an exemplary block diagram of Bluetooth device 500. As shown, device 500 may include transmitter 501, receiver 502, graphical-user interface (GUI) 506, logic circuitry (microprocessor) 503, and context-aware circuitry 511. In other implementations, device 500 may include more, fewer, or different components. For example, device 500 may include additional transmitters and receivers to communicate over a long-range over-the-air interface. For example, although not shown, device 500 may include wellknown long-range and/or short-range transceivers that utilize a private 802.11 network, a next-generation cellular communications network operated by a cellular service provider, or any public-safety network such as an APCO 25 network or the FirstNet broadband network.

Transmitter 501 and receiver 502 are preferably a short-range transmitter and receiver that utilizes the Bluetooth and/or Bluetooth LE communication system protocol. GUI 506 may include a device that can display images, text, notifications, . . . , etc. Logic circuitry 503 comprises a digital signal processor (DSP), general purpose microprocessor, a programmable logic device, or application specific integrated circuit (ASIC) and is utilized to accesses context-aware circuitry 511 and determine potential devices to pair with, and pair with devices as described above.

Context-aware circuitry 511 may comprise any device capable of generating an estimated orientation of device 500. For example, context-aware circuitry 511 may comprise an accelerometer capable of determining device orientation. Context-aware circuitry may also comprise a level, a compass, gyroscope, or any combination of the above.

Figure 6:
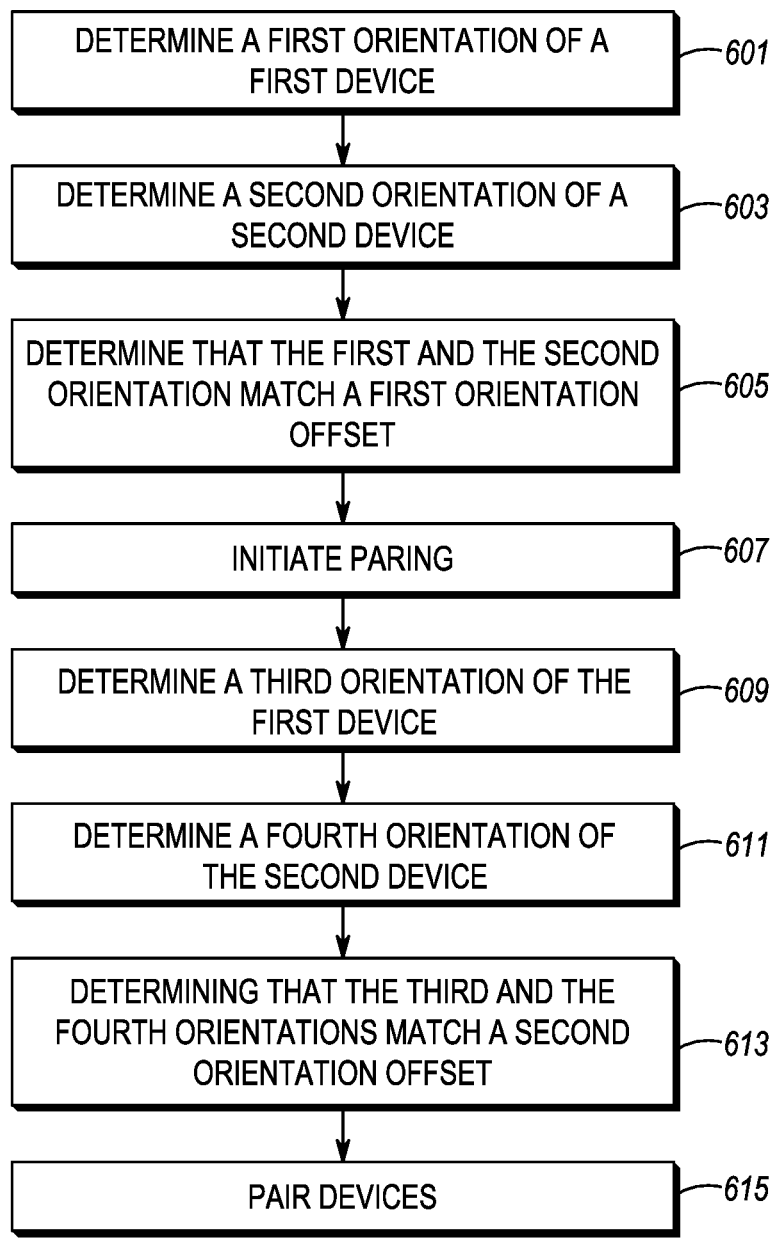
FIG. 6 is a flow chart showing operation of the device of FIG. 3 when pairing as a master device.

FIG. 6 is a flow chart showing operation of the device of FIG. 5 during pairing. The logic flow begins at step 601 where logic circuitry 503 determines a first orientation of device 500 (first device). This determination is made by accessing context-aware circuitry 511. At step 603 logic circuitry 503 determines a second orientation of a second device. More particularly, receiver 502 provides orientation information received to logic circuitry 503. As discussed above, this information is provided as part of out-of-band signaling as described in the Bluetooth communication system protocol.

Once logic circuitry determines its orientation and the orientation of other nearby devices, logic circuitry 503 determines that the first and the second orientation match a first orientation offset with respect to each other (step 605). As discussed above, the preferred first orientation is a 90 degree offset with respect to each other; however, in alternate embodiments of the present invention other orientations may be used to initiate pairing. At step 607 pairing of the first and the second devices is initiated based on the fact that the first and the second orientation match the first orientation offset. As described above, when pairing is initiated, a notification may be provided to the user(s) of the first and second device so that they can rotate each device into a proper position to complete the pairing.

After a predetermined period of time (e.g., 3 seconds) logic circuitry 503 determines a third orientation of the first device (609) and a fourth orientation of the second device (611). Logic circuitry then determines that the third and the fourth orientations match a second orientation offset (step 613) and completes the pairing of the first and the second devices when the third and the fourth orientations match the second orientation offset and both devices have been rotated (615). More particularly, to complete the pairing the rotation of both the first and second devices to a final position with the second orientation offset causes the devices to either exchange out-of-band data which is used to establish communication between the first and second device or initiate standard Bluetooth pairing. For example, Bluetooth could use the out-of-band information for the establishment of a link key. In some embodiments, the absolute orientation of one or both devices or their relative orientation may be used as part of the link key establishment process.

As discussed above, the step of pairing additionally comprises the step of pairing the first and the second devices when the first and the second orientations match and both devices have rotated from their initial orientations. Additionally, in one embodiment, the first orientation offset is 45 degrees and the second orientation offset is zero. Finally, the step of determining second orientation of the second device and determining fourth orientation of a second device comprises the step of receiving the second and fourth orientations as an over-the-air message.

Figure 7:
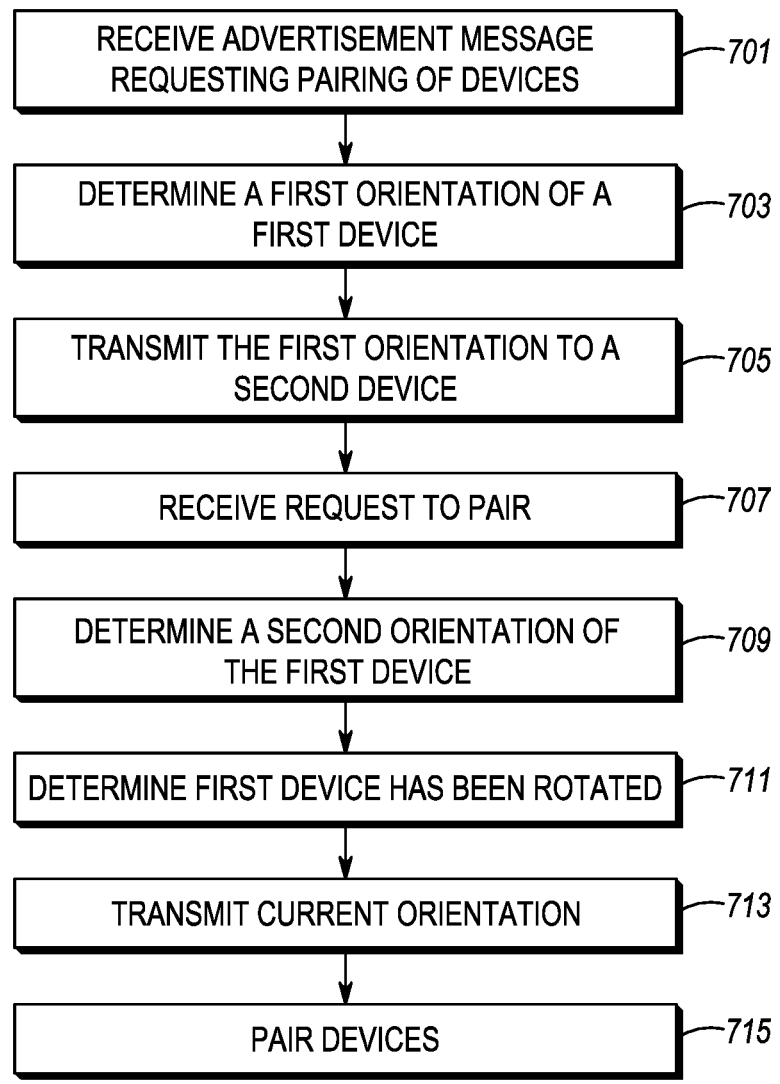
FIG. 7 is a flow chart showing operating of the device of FIG. 3 when pairing as a slave device.

FIG. 7 is a flow chart showing operation of the device of FIG. 5 during pairing, when device 500 is acting as a slave device. As mentioned above, upon power up or user initiation, a master device will both advertise and listen for advertisement messages from devices that are in close proximity (say a short distance such as several centimeters or less, as determined by a signal strength). However, a slave device will only listen for advertisement messages. The logic flow begins at step 701 where receiver 502 receives an advertisement message requesting paring of devices and passes this to logic circuitry 503. In response, at step 703 logic circuitry 503 determines a first orientation of device 500 (first device). This determination is made by accessing context-aware circuitry 511. At step 705 logic circuitry 503 instructs transmitter 501 to transmit an orientation (e.g., −45 degrees from vertical) to a master device (second device). As discussed above, this information is provided as part of out-of-band signaling as described in the Bluetooth communication system protocol.

At step 707 receiver 502 receives a request to pair with the second device based on the fact that the first and the second devices are offset a predetermined amount (first orientation offset). As described above, when pairing is initiated, a notification may be provided to the user(s) of the first and second device so that they can rotate each device into a proper position to complete the pairing.

After a predetermined period of time (e.g., 3 seconds) logic circuitry 503 determines a second orientation of the first device (709). Logic circuitry then determines that the first device has been rotated (step 711) and transmits the second orientation to the second device (step 713). The pairing of the first and the second devices is completed when the first and the second devices are substantially aligned (step 715).

As discussed above, the first, second, third, and fourth orientations are determined via an over-the-air transmission (OOB signaling) between the first and the second devices. However, in an alternate embodiment of the present invention devices could locally detect the orientation offset without exchanging information with each other. This would eliminate steps 601, 603, 609, and 611 from the above flow chart.

In the foregoing specification, specific embodiments have been described. However, one of ordinary skill in the art appreciates that various modifications and changes can be made without departing from the scope of the invention as set forth in the claims below. For example, absolute orientation may additionally be considered in the pairing initiation process. In addition to the detection of a first orientation offset between the first device and second device, at least one device shall have an absolute orientation in space within a pre-defined threshold.

In an alternate embodiment, to further increase the security of the pairing process, transmitter 501 could operate at a first power level during the discovery phase and at a second level during the completion of pairing, where the second power level is lower than the first power level. For example, the first power level may be a "medium" power level from transmitter 501 to detect proximate devices but to minimize detection of distant devices. Once the first offset orientation is detected, transmitter 501 can be reduced to the second power level, which is preferably the lowest power level supported by transmitter 501. Since the devices are substantially proximate during the pairing completion process (i.e. during rotation), communication would still be possible with very low power but eavesdropping by an attacker would be very difficult. Therefore, a first orientation (used to determine a first orientation offset) can be transmitted using a first power level and a second orientation (used to determine a second orientation offset) can be transmitted at a second power level In yet another embodiment, the pairing completion process could be extended to include a multiple-step process. Pairing is initiated with a first orientation offset between the first and second devices, followed by a plurality of successive orientation offsets. The successive orientation offsets comprise a sequence analogous to a combination lock. To complete the pairing process, the user must recreate the expected sequence. There can be any number of successive orientation offsets which may even include the first orientation offset. In an additional form of this embodiment, it is not required to move both devices: the first device may be rotated while the second device remains fixed in space. In this embodiment, a plurality of further orientation offsets of the first device and the second device may be determined, and the first and the second devices are paired when the plurality of further orientation offsets match a plurality of predefined orientation offsets.

Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for pairing two devices, the method comprising the steps of:
    determining a first orientation of a first device;
    determining a second orientation of a second device;
    determining an orientation offset between the first orientation and the second orientation;
    determining if the orientation offset between the first orientation and the second orientation matches a first orientation offset;
    initiating a pairing of the first and the second devices based on the orientation offset between the first orientation and the second orientation matching the first orientation offset;
    determining a third orientation of the first device;
    determining a fourth orientation of the second device;
    determining an orientation offset between the third orientation and the fourth orientation;
    determining if the orientation offset between the third orientation and the fourth orientation is zero; and
    pairing the first and the second devices when orientation offset between the third orientation and the fourth orientation is zero, and when both devices have rotated from their initial orientations.

2. The method of claim 1 wherein the step of pairing additionally comprises the step of:
    pairing the first and the second devices when the third and the fourth orientations match and both devices have rotated from their initial orientations.

3. The method of claim 1 wherein the first orientation offset is 45 degrees.

4. The method of claim 1 wherein the step of determining the second orientation of the second device and determining fourth orientation of the second device comprises the step of receiving the second and fourth orientations as an over-the-air message.

5. The method of claim 1 wherein the first and the second orientations are determined via an over-the-air transmission from the first and the second devices, respectively.

6. The method of claim 1 wherein the third orientation and the fourth orientation are determined via an over-the-air transmission from the first and the second devices, respectively.

7. A method comprising the steps of:
   receiving an advertisement message requesting pairing of devices;
   determining a first orientation of a first device;
   transmitting the first orientation to a second device;
   receiving, from the second device, a request to pair the first and the second devices;
   determining a second orientation of the first device;
   determining that the first device has been rotated;
   transmitting the second orientation to the second device; and
   pairing the first and the second devices;
   wherein the first and the second devices are paired only when the first device has been rotated and a final orientation of the first and the second devices align.

8. The method of claim 7 wherein the first orientation is transmitted using a first power level and the second orientation is transmitted at a second power level.

9. An apparatus comprising:
   context-aware circuitry determining a first orientation of a first device;
   a receiver, receiving a second orientation of a second device;
   logic circuitry determining an orientation offset between the first and the second orientations and determining if the orientation offset between the first and the second orientations matches a first orientation offset, and the logic circuitry initiating a pairing of the first and the second devices based on the orientation offset between the first and the second orientations matching the first orientation offset;
   the context-aware circuitry determining a third orientation of the first device;
   the receiver receiving a fourth orientation of the second device; and
   the logic circuitry determining an orientation offset between the third and the fourth orientations and determining if the orientation offset between the third and the fourth orientations is zero and pairing the first and the second devices when the orientation offset between the third and the fourth orientations is zero and both devices have rotated from their initial orientations.

10. The apparatus of claim 9 wherein the first and the second devices are paired only when the third and the fourth orientations match and both devices have rotated from their initial orientations.

11. The apparatus of claim 9 wherein the first orientation offset is 45 degrees.

* * * * *